(12) United States Patent
Feichtenschlager et al.

(10) Patent No.: US 9,688,864 B2
(45) Date of Patent: Jun. 27, 2017

(54) PUMPABLE SHELF-STABLE SUSPENSION OF FIBERS IN AN ORGANIC PHASE

(71) Applicant: BASF SE, Ludwigshafen am Rhein (DE)

(72) Inventors: Bernhard Feichtenschlager, Traunstein (DE); Radoslaw Kierat, Altenmarkt (DE); Christian Buchner, Peterskirchen (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 14/902,255

(22) PCT Filed: Jun. 10, 2014

(86) PCT No.: PCT/EP2014/061971
§ 371 (c)(1),
(2) Date: Dec. 30, 2015

(87) PCT Pub. No.: WO2015/014520
PCT Pub. Date: Feb. 5, 2015

(65) Prior Publication Data
US 2016/0280929 A1  Sep. 29, 2016

(30) Foreign Application Priority Data

Jul. 31, 2013  (EP) ..................... 13178707

(51) Int. Cl.
| | |
|---|---|
| *C08K 5/29* | (2006.01) |
| *C09D 5/02* | (2006.01) |
| *B01F 17/00* | (2006.01) |
| *C09D 101/02* | (2006.01) |
| *C09D 123/12* | (2006.01) |
| *C09D 129/04* | (2006.01) |
| *C09D 167/04* | (2006.01) |
| *C08K 5/01* | (2006.01) |

(52) U.S. Cl.
CPC ............ *C09D 5/027* (2013.01); *B01F 17/005* (2013.01); *B01F 17/0042* (2013.01); *C09D 101/02* (2013.01); *C09D 123/12* (2013.01); *C09D 129/04* (2013.01); *C09D 167/04* (2013.01); *C08K 5/01* (2013.01); *C08K 5/29* (2013.01); *C08K 2201/018* (2013.01)

(58) Field of Classification Search
CPC .... C09D 5/027; C09D 129/04; C09D 123/12; C09D 167/04; C09D 101/02; C08K 2201/018; C08K 5/29; C08K 5/01
USPC .......................................................... 524/196
See application file for complete search history.

(56) References Cited

U.S. PATENT DOCUMENTS

2008/0146701 A1* 6/2008 Sain ................ B82Y 30/00
524/9
2014/0329017 A1* 11/2014 Wang ................ C08F 32/02
427/331

FOREIGN PATENT DOCUMENTS

| | | |
|---|---|---|
| DE | 101 50 998 A1 | 6/2002 |
| JP | 2006-124847 A | 5/2006 |

OTHER PUBLICATIONS

Product information of HYBON 2002, PPG Fiber Glass, 2016.*
Wallenberger et al., ASM Handbook, vol. 21: Composites (#06781G), 2001.*

* cited by examiner

*Primary Examiner* — Hui Chin
(74) *Attorney, Agent, or Firm* — Oblon, McClelland, Maier & Neustadt, L.L.P.

(57) ABSTRACT

A pumpable shelf-stable suspension of fibers in an organic phase comprising 1.0-60 wt % of fibers and 0.01-10 wt % of a disubstituted urea is proposed as well as a method using the disubstituted urea to suspend fibers in an organic phase.

15 Claims, No Drawings

PUMPABLE SHELF-STABLE SUSPENSION OF FIBERS IN AN ORGANIC PHASE

This application is a §371 of International Application No. PCT/EP2014/061971 filed Jun. 10, 2014, and claims priority from European Patent Application No. 13178707.9 filed Jul. 31, 2013.

The present invention relates to a pumpable shelf-stable suspension of fibers in an organic phase and also to a method of using a disubstituted urea to suspend fibers in an organic phase.

The production of fiber-containing coatings, floorcoverings, tires, artificial leathers and the like generally requires the metered addition of fibers. Handling these fibers is often difficult. Especially when fibers are to be added to oily, hydrophobic liquids, unwelcome issues can arise because of insufficient suspendability on the part of the fibers, possibly also due to electrostatic effects, due to clumping of the fibers (known as "birdnesting"), etc. It is also the case that these kinds of fibers, in particular chopped fibers, are often difficult to convey. Batchwise addition, possibly by hand, to organic formulations in particular, by contrast, is associated with increased labor requirements and hence increased costs.

The problem addressed by the present invention was that of substantially resolving the aforementioned issues. The problem was more particularly that of providing a fiber preparation which is readily handleable, ideally conveyable mechanically and does not throw a sediment even in the course of prolonged storage. The problem addressed was more particularly that of providing the pumpable shelf-stable suspension of the present invention.

The problem is solved by the features of the independent claims. The dependent claims relate to preferred embodiments of the present invention.

It was found that, surprisingly, disubstituted ureas are able to stabilize a multiplicity of fibers permanently and in the form of a pumpable suspension.

The present invention accordingly provides in a first aspect a pumpable shelf-stable suspension of fibers in an organic phase, comprising 1.0-60 wt % of fibers, and 0.01-10 wt % of a disubstituted urea (the organic phase comprises the remainder). The suspension can additionally comprise further ingredients, in which case all percentages have to sum to 100 wt %, as will be appreciated.

Preferably, the suspension of the present invention comprises 10-60 wt %, especially 25-50 wt % of fibers.

It is further preferable for the suspension of the present invention to comprise 0.05-10 wt %, especially 0.1-5 wt % of the disubstituted urea.

For the purposes of the present invention, an "organic phase" is generally any liquid organic compound that is not miscible with water. Not miscible with water is to be understood in this context as meaning that two phases form in the organic compound/water system. More particularly, said organic compound shall have a solubility in water at 20° C. of less than 10 wt %, preferably less than 2 wt % and especially less than 1 wt %.

"Organic phase" is preferably to be understood as meaning, by contrast, a mineral oil, crude oil, paraffin oil, benzine, petroleum, naphthenic oil, aromatic oil, an aliphatic or aromatic hydrocarbon such as, for example, benzene, toluene and xylene, a fatty oil (triglyceride), a fatty acid ester such as, for example, biodiesel, a silicone oil, but also customary plasticizers such as, for example, various phthalate esters and hydrogenated phthalate esters. The "organic phase" can further also be a reactive component for polymer formation, for example an acrylate or an isocyanate. Mixtures of two or more of these compounds can also be used, however. Aliphatic and aromatic hydrocarbons are very particularly preferred.

"Fibers" are flexible structures which are thin compared with their length in that they have a length/diameter ratio of preferably not less than 10:1 and more preferably of not less than 100:1. Fibers suitable for the purposes of the present invention can consist of a multiplicity of different materials, for example of polyolefins comprising polyethylene and polypropylene; polyvinyl alcohol; polyacrylonitrile; polyesters comprising polyglycol adipate, polyethylene terephthalate, polylactic acid (PLA); polyamides comprising polycaprolactam, nylon 66, nylon 6T; inorganic materials comprising glass, carbon, basalt and metals; or renewable materials comprising cellulose and lignin; and mixtures thereof.

The fibers conveniently have diameters of 2 µm to 2 mm, preferably 10 µm to 100 µm, and lengths of conveniently 0.1 mm to 25 cm, preferably of 1 mm to 10 cm, subject to the proviso of an aspect ratio (length/diameter ratio) of not less than 10, preferably not less than 100. Particularly preferred chopped fibers are not more than 2.5 cm in length.

The "disubstituted urea" is obtainable from a monoisocyanate or polyisocyanate and an organic amine. The monoisocyanate conforms to the formula $R^1$—NCO, where $R^1$ is preferably selected from methyl, ethyl, n-propyl, isopropyl, n-butyl, sec-butyl, tert-butyl, n-pentyl, neopentyl, n-hexyl, 2-ethyl-n-hexyl, n-lauryl, cyclohexyl, phenyl and benzyl. The polyisocyanate is preferably an aliphatic isocyanate, an aromatic isocyanate or a combined aliphatic-aromatic isocyanate having an NCO functionality (number of NCO groups in the molecule) from 2 to 5, preferably from 2 to 3. Suitable polyisocyanates comprise tetramethylene 1,4-diisocyanate, 2-methyl-pentamethylene 1,5-diisocyanate, hexamethylene 1,6-diisocyanate (HDI), 2,2,4- and 2,4,4-trimethylhexamethylene 1,6-diisocyanate (TMDI), dodecamethylene 1,12-diisocyanate, lysine diisocyanate, lysine ester diisocyanate, 1-isocyanato-3,3,5-trimethyl-5-isocyanatomethyl-cyclohexane (isophorone diisocyanate—IPDI), 1,4-diisocyanato-2,2,6-trimethylcyclohexane (TMCDI), 2,2'-, 2,4'- and 4,4'-dicyclohexylmethane diisocyanate ($H_{12}$MDI), cyclohexane 1,3-diisocyanate and cyclohexane 1,4-diisocyanate (CHDI), 1,3- and 1,4-bis(isocyanatomethyl)-cyclohexane, 4,4'-diisocyanatodicyclohexyl-2,2-propane, m- and p-phenylene diisocyanate, 2,3,5,6-tetramethyl-1,4-diisocyanatobenzene, 3,3'-dimethyl-4,4'-diisocyanatobiphenyl (TOBI), 2,4- and 2,6-tolylene diisocyanate (TDI), 2,2'-, 2,4'- and 4,4'-diphenylmethane diisocyanate (MDI), naphthalene 1,2-diisocyanate and naphthalene 1,5-diisocyanate (NDI), m- and p-xylylene diisocyanate (XDI), tetramethylxylylene diisocyanate (TMXDI), and also any desired mixtures thereof. For the purposes of the present invention, the polyisocyanates of the present invention shall also comprise dimers (uretdiones) and trimers (isocyanurates). The HDI trimer is particularly important here. Oligomers shall further also be comprehended, an example being "polymeric MDI" where n=1 to 8:

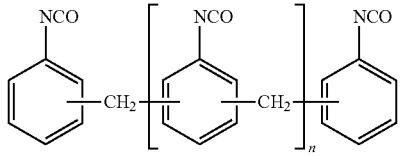

The "organic amine" is preferably an unsubstituted unbranched, branched or cyclic, saturated or olefinically mono- or polyunsaturated primary amine, preferably a primary aliphatic amine and especially a fatty amine.

The present invention has been found to work particularly well with $C_{6-22}$alkylamines, especially oleylamine and this especially in combination with MDI.

The disubstituted urea obtainable by reacting the isocyanate with the organic amine is either prepared directly in the organic phase or prepared in a solvent and obtained as redissolvable powder by drying.

The present invention further provides the method of using said disubstituted urea to suspend fibers in said organic phase.

The examples which follow illustrate the invention.

EXAMPLES

Example 1: Reaction of Oleylamine with MDI 100 g of oleylamine were dissolved in 300 g of toluene. Under vigorous agitation, 46.77 g of MDI (Lupranat® MI from BASF SE—isomer mixture) were dissolved in 300 g of toluene in another vessel and gradually (the temperature rises) added to the oleylamine solution. Agitation was continued for a further 30 min before the solvent was evaporated to obtain the product as a whitish waxy powder.

Example 2: Reaction of Oleylamine with MDI 34.07 g of oleylamine were mixed with 600 g of paraffin oil ($C_{11-25}$ fraction) under vigorous agitation. Under vigorous agitation, 15.93 g (Lupranat® MI from BASF SE—isomer mixture) were dissolved in 300 g of toluene in another vessel and gradually added to the oleylamine solution (slight rise in temperature). Agitation was continued for a further 30 min to obtain the product as a colorless, slightly opaque, viscous, thixotropic but nonetheless pressure-pumpable solution.

Example 3: Properties of Fiber Suspension According to the Present Invention

A suspension was prepared from 50 ml of paraffin oil ($C_{11-25}$ fraction), 3.0 g of product from Example 1 and 40 g of polylactic acid fibers (about 6 mm in length, <20 μm in thickness) and stored in a screw lid jar for 3 hours or 1 week. There was no observable sedimentation of fibers. Suspension pumpability was tested using a pressure-driven cartridge press. Using a pumping pressure of 1 bar, a hole diameter of 20 mm and a cartridge diameter of 4.6 cm, an 80.1 g quantity of the suspension could be pumped within 3 seconds (26.7 g/s). No observable separation occurred during pumping.

Example 4: Various Test Series

Example 3 was repeated with different fibers, solvents and dispersants. The results are shown in table 1 (storage tests) and table 2 (pumping tests). Hand pumping was used in contrast to Example 3. It is apparent that only the disubstituted ureas of the present invention solve the problem defined at the beginning, and that oleylamine combined with MDI works best.

TABLE 1

| Test No. | Dispersant | Amount of dispersant | Solvent | Amount of solvent | Fiber type | Fiber quantity | Stab. 1 h | Stab. 24 h | Stab. 14 d | Comments |
|---|---|---|---|---|---|---|---|---|---|---|
| 1 | none | | paraffin oil | 50 ml | PLA, PP | 10 g | no | no | no | unbrushable, separates |
| 2 | none | | aromatics | 50 ml | PLA, PP | 10 g | no | no | no | unbrushable, separates |
| 3 | Lutensol ® GD 70 | 1 g | aromatics | 100 ml | PLA, PP | 3 g | no | no | no | unbrushable, separates |
| 4 | Triton ® CG 110 | 1 g | aromatics | 100 ml | PLA, PP | 3 g | no | no | no | unbrushable, separates |
| 5 | Triton ® H 66 | 1 g | aromatics | 100 ml | PLA, PP | 3 g | no | no | no | unbrushable, separates |
| 6 | sodium dodecylsulfate | 1 g | aromatics | 100 ml | PLA, PP | 3 g | no | no | no | unbrushable, separates |
| 7 | Sovermol ® 1111 | 1 g | aromatics | 100 ml | PLA, PP | 3 g | no | no | no | unbrushable, separates |
| 8 | Sovermol ® 920 | 1 g | aromatics | 100 ml | PLA, PP | 3 g | no | no | no | unbrushable, separates |
| 9 | methyl laurate | 1 g | aromatics | 100 ml | PLA, PP | 3 g | no | no | no | unbrushable, separates |
| 10 | butyl acetate | 1 g | aromatics | 100 ml | PLA, PP | 3 g | no | no | no | unbrushable, separates |
| 11 | BYK ® 306 | 1 g | aromatics | 100 ml | PLA, PP | 3 g | no | no | no | unbrushable, separates |
| 12 | Disperbyk ® 180 | 1 g | aromatics | 100 ml | PLA, PP | 3 g | no | no | no | unbrushable, separates |
| 13 | BYK ® W 980 | 1 g | aromatics | 100 ml | PLA, PP | 3 g | no | no | no | unbrushable, separates |
| 14 | DBE-IB | 1 g | aromatics | 100 ml | PLA, PP | 3 g | no | no | no | unbrushable, separates |
| 15 | castor oil | 1 g | aromatics | 100 ml | PLA, PP | 3 g | no | no | no | unbrushable, separates |
| 16 | oleylamine-Lupranat ® MI | 1 g | aromatics | 100 ml | PLA | 3 g | yes | yes | yes | thickening effect, brushable |
| 17 | oleylamine-Lupranat ® MI | 1 g | aromatics | 100 ml | PLA | 20 g | yes | yes | yes | thickening effect, brushable |
| 18 | oleylamine-Lupranat ® MI | 2 g | aromatics | 100 ml | PLA | 10 g | yes | yes | yes | thickening effect, brushable |
| 19 | oleylamine-Lupranat ® MI | 2 g | aromatics | 100 ml | PLA | 30 g | yes | yes | yes | thickening effect, brushable |
| 20 | oleylamine-Lupranat ® MI | 4 g | aromatics | 100 ml | PLA | 3 g | yes | yes | yes | thickening effect, brushable |
| 21 | oleylamine-Lupranat ® MI | 4 g | aromatics | 100 ml | PLA | 10 g | yes | yes | yes | thickening effect, brushable |
| 22 | oleylamine-Lupranat ® MI | 1 g | paraffin oil | 50 ml | PLA | 20 g | yes | yes | yes | thickening effect, brushable |
| 23 | oleylamine-Lupranat ® MI | 1 g | paraffin oil | 50 ml | PLA | 30 g | yes | yes | yes | thickening effect, brushable |
| 24 | oleylamine-Lupranat ® MI | 2 g | paraffin oil | 50 ml | PLA | 20 g | yes | yes | yes | thickening effect, brushable |
| 25 | oleylamine-Lupranat ® MI | 2 g | paraffin oil | 50 ml | PLA | 30 g | yes | yes | yes | thickening effect, brushable |
| 26 | oleylamine-Lupranat ® MI | 3 g | paraffin oil | 50 ml | PLA | 40 g | yes | yes | yes | thickening effect, brushable |
| 27 | oleylamine-Lupranat ® MI | 2 g | paraffin oil | 50 ml | PP | 10 g | yes | yes | yes | thickening effect, brushable |
| 28 | oleylamine-Lupranat ® MI | 2 g | paraffin oil | 50 ml | PVA | 10 g | yes | yes | yes | thickening effect, brushable |

TABLE 1-continued

| Test No. | Dispersant | Amount of dispersant | Solvent | Amount of solvent | Fiber type | Fiber quantity | Stab. 1 h | Stab. 24 h | Stab. 14 d | Comments |
|---|---|---|---|---|---|---|---|---|---|---|
| 29 | oleylamine-Lupranat ® MI | 2 g | paraffin oil | 50 ml | cellulose | 10 g | yes | yes | yes | thickening effect, brushable |
| 30 | octadecylamine-Lupranat ® MI | 5 g | paraffin oil | 50 ml | PLA, PP | 20 g | yes | yes | yes | minimal sedimentation |
| 31 | ethylhexylamine-Lupranat ® MI | 5 g | paraffin oil | 50 ml | PLA, PP | 20 g | yes | yes | yes | minimal sedimentation |
| 32 | oleylamine-Desmodur ® N3600 | 3 g | paraffin oil | 50 ml | PLA, PP | 10 g | yes | no | no | stable for some hours |
| 33 | tallowamine-Lupranat ® MI | 3 g | paraffin oil | 50 ml | PLA, PP | 10 g | yes | yes | yes | moderately thickening effect |

Legend
paraffin oil: $C_{11-25}$ fraction
PLA: polylactic acid fibers, about 6 mm in length, <20 μm in thickness
PLA, PP: the two fiber types were tested separately
cellulose: cellulose fibers, approximately identical dimensions
Triton ® CG 110: Dow Chemicals ® alkylpolyglucoside surfactant
Sovermol ® 1111: BASF SE-branched polyether polyol
BYK ® 306: silicone surfactant from Byk
DBE-IB: high-boiling oxygenated solvent-containing diisobutyl adipate, glutarate and succinate mixture from Invista
Lupranat ® MI: BASF SE-MDI isomer mixture
tallowamine: aminated animal tallow (fatty amine)
aromatics: mixture of $C_9$ aromatics
PP: polypropylene fibers, approximately identical dimensions
PVA: polyvinyl alcohol fibers, approximately ca. identical dimensions
Lutensol ® GD 70: BASF SE-alkylpolyglucoside surfactant
Triton ® H 66: Dow Chemicals-anionic phosphate polyether surfactant
Sovermol ® 920: BASF SE-branched polyether polyol
Disperbyk ® 180: dispersing additive for organic systems, from Byk
BYK ® W 980: dispersing additive for organic resins, from Byk
Desmodur ® N 3600: Bayer AG, HDI trimer

TABLE 2

| Test No. | Dispersant | Amount of dispersant | Solvent | Amount of solvent | Fiber type | Fiber quantity | Pumped quantity [%] | Pumping time | Ejection hole | Comments |
|---|---|---|---|---|---|---|---|---|---|---|
| 1 | oleylamine-Lupranat ® MI | 2 g | aromatics | 100 ml | PLA | 30 g | 70% | 10 s | Ø 1 cm | hole clogs up |
| 2 | oleylamine-Lupranat ® MI | 4 g | aromatics | 100 ml | PLA | 10 g | 70% | 10 s | Ø 1 cm | ejection almost complete before clogging |
| 3 | oleylamine-Lupranat ® MI | 1 g | paraffin oil | 50 ml | PLA | 10 g | 96% | 10 s | Ø 2 cm | works very well, homogeneous extrudate |
| 4 | oleylamine-Lupranat ® MI | 1 g | paraffin oil | 50 ml | PLA | 20 g | 96% | 10 s | Ø 2 cm | works very well, homogeneous extrudate |
| 5 | oleylamine-Lupranat ® MI | 2 g | paraffin oil | 50 ml | PLA | 20 g | 96% | 10 s | Ø 2 cm | works very well, homogeneous extrudate |
| 6 | oleylamine-Lupranat ® MI | 2 g | paraffin oil | 50 ml | PLA | 25 g | 96% | 10 s | Ø 2 cm | works very well, homogeneous extrudate |
| 7 | oleylamine-Lupranat ® MI | 1 g | paraffin oil | 50 ml | PLA | 30 g | 96% | 10 s | Ø 2 cm | works poorly, clogs up, too little dispersant |
| 8 | oleylamine-Lupranat ® MI | 2 g | paraffin oil | 50 ml | PP | 10 g | 96% | 10 s | Ø 2 cm | works very well, homogeneous extrudate |
| 9 | oleylamine-Lupranat ® MI | 2 g | paraffin oil | 50 ml | PVA | 10 g | 96% | 10 s | Ø 2 cm | works very well, homogeneous extrudate |
| 10 | oleylamine-Lupranat ® MI | 2 g | paraffin oil | 50 ml | cellulose | 10 g | 96% | 10 s | Ø 2 cm | works very well, homogeneous extrudate |
| 11 | oleylamine-Lupranat ® MI | 2 g | paraffin oil | 50 ml | PLA | 30 g | 96% | 10 s | Ø 2 cm | works very well, homogeneous extrudate |
| 12 | oleylamine-Lupranat ® MI | 3 g | paraffin oil | 50 ml | PLA | 40 g | 96% | 10 s | Ø 2 cm | works very well, homogeneous extrudate |
| 13 | oleylamine-Lupranat ® MI | 2.5 g | paraffin oil | 50 ml | PLA | 50 g | 90% | 10 s | Ø 2 cm | still works fairly well, homogeneous extrudate |

Legend as for Table 1

What is claimed is:

1. A pumpable shelf-stable suspension of fibers in an organic phase, comprising:
   1.0-60 wt % of fibers; and
   0.01-10 wt % of a disubstituted urea.

2. The pumpable shelf-stable suspension according to claim 1, wherein the fibers are present in an amount of from 10-60 wt %.

3. The pumpable shelf-stable suspension according to claim 1, wherein the fibers are present in an amount of from 25-50 wt %.

4. The pumpable shelf-stable suspension according to claim 1, wherein the disubstituted urea is present in an amount of from 0.05-10 wt %.

5. The pumpable shelf-stable suspension according to claim 1, wherein the disubstituted urea is present in an amount of from 0.1-5 wt %.

6. The pumpable shelf-stable suspension according to claim 1, wherein the organic phase comprises at least one member selected from the group consisting of mineral oil, crude oil, paraffin oil, benzene, petroleum, a naphthenic oil, an aromatic oil, an aliphatic hydrocarbon, an aromatic hydrocarbon, a fatty oil, a fatty acid ester, a silicone oil and a phthalate ester.

7. The pumpable shelf-stable suspension according to claim 1, wherein the fibers comprise a material selected from the group consisting of a polyolefin, a polyester, a polyvinyl alcohol, a polyacetonitrile, a polyamide, polyethylene terephthalate, a polylactic acid, nylon 66 and nylon 6T.

8. The pumpable shelf-stable suspension according to claim 1, wherein the fibers comprise at least one material selected from the group consisting of polyethylene, polypropylene, polyglycol adipate and polycaprolactam.

9. The pumpable shelf-stable suspension according to claim 1, wherein the fibers comprise an inorganic material.

10. The pumpable shelf-stable suspension according to claim 9, wherein the inorganic material comprises at least one member selected from the group consisting of glass, carbon, basalt and a metal.

11. The pumpable shelf-stable suspension according to claim 1, wherein the fibers comprise a member selected from the group consisting of a renewable material, wherein said renewable material comprises a member selected from the group consisting of cellulose and lignin.

12. The pumpable shelf-stable suspension according to claim 1, wherein the fibers have a diameter of from 2 μm to 2 mm subject to the proviso of an aspect ratio of not less than 10.

13. The pumpable shelf-stable suspension according to claim 1, wherein the disubstituted urea is obtained from a monoisocyanate or polyisocyanate and a fatty amine.

14. The pumpable shelf-stable suspension according to claim 1, wherein the disubstituted urea is obtained from oleylamine and diphenylmethane diisocyanate (MDI).

15. A method of preparing the pumpable shelf-stable suspension according to claim 1 comprising adding to a mixture of the fibers in the organic phase the disubstituted urea.

* * * * *